March 5, 1929.　　　E. B. LOCKE　　　1,704,200
COMPUTING MECHANISM
Filed April 17, 1922　　2 Sheets-Sheet 1
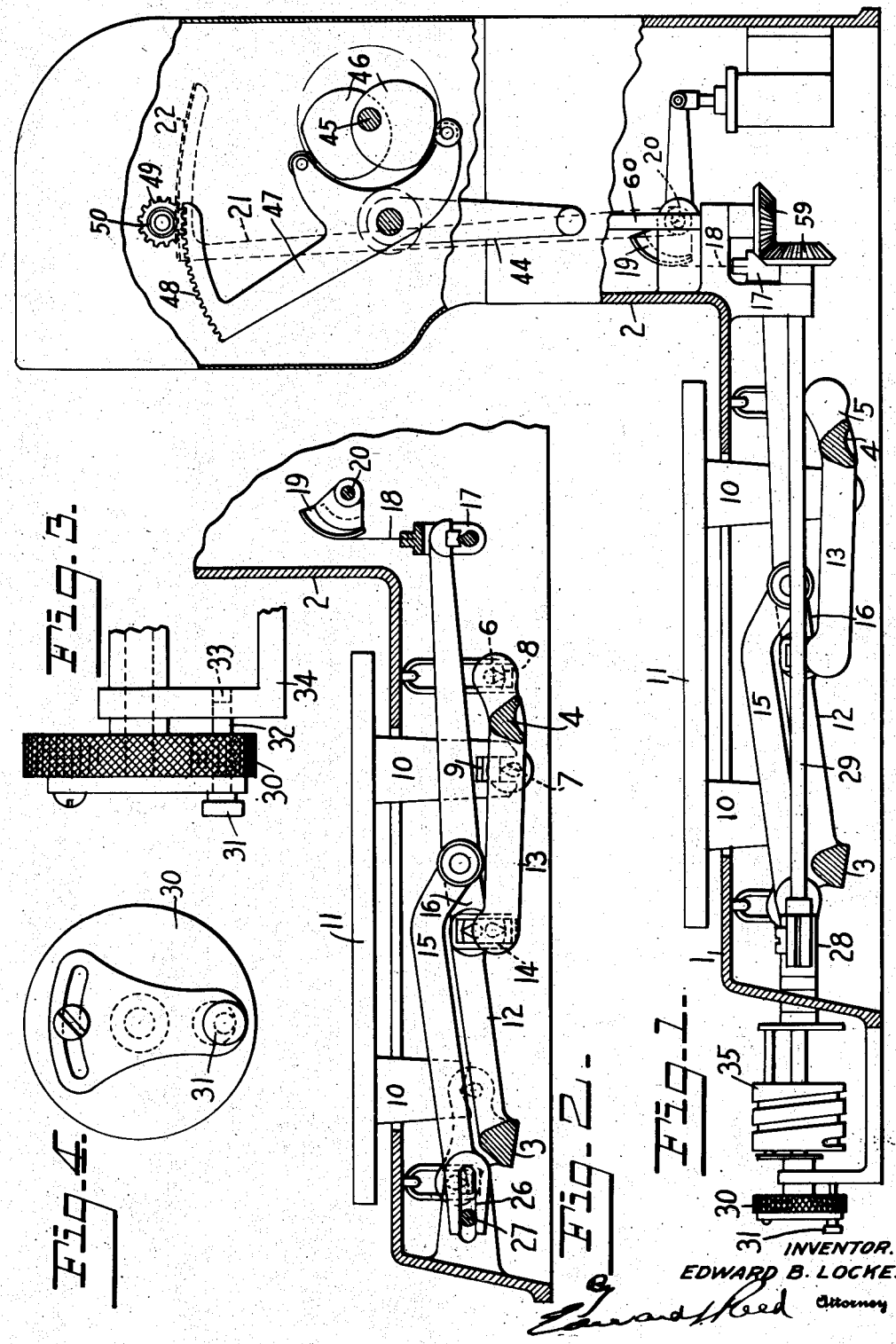
INVENTOR.
EDWARD B. LOCKE.

March 5, 1929.  E. B. LOCKE  1,704,200
COMPUTING MECHANISM
Filed April 17, 1922   2 Sheets-Sheet 2

INVENTOR.
EDWARD B. LOCKE.

Patented Mar. 5, 1929.

1,704,200

UNITED STATES PATENT OFFICE.

EDWARD B. LOCKE, OF DAYTON, OHIO, ASSIGNOR, BY MESNE ASSIGNMENTS, TO INTERNATIONAL BUSINESS MACHINES CORPORATION, OF NEW YORK, N. Y., A CORPORATION OF NEW YORK.

COMPUTING MECHANISM.

Application filed April 17, 1922. Serial No. 554,045.

This invention relates to computing mechanism and is in the nature of an improvement on the mechanisms of my copending applications, Serial No. 539,877 filed Feb. 28, 1922, and Serial No. 546,657 filed March 25, 1922. Those applications relate more particularly to the counting scales and the weighing mechanism is adjustable to accommodate the scales to articles, or units, of different weights. In the first mentioned application the adjustment is manual while in the second application the adjustment is automatic. When these mechanisms are accurately constructed and assembled the count, or computation, will be accurate in all adjusted positions of the mechanism. However, in the manufacture of such mechanisms on a production basis there will sometimes be minor variations in construction or inaccuracies in assembling which will affect the accuracy of the computation in one or more of the adjusted positions but which can not be detected until the mechanism is completely assembled and tested. The correction of these inaccuracies is frequently a difficult and tedious operation, it sometimes being necessary to completely disassemble the mechanism, and this, of course, involves a very considerable expense.

One object of the present invention is to provide means for automatically compensating for these irregularities so that an accurate computation may be had in all aljustments of the mechanism.

A further object of the invention is to provide means for automatically adjusting the indicator upon each adjustment of the weighing mechanism to accommodate it to any irregularities in the operation of the mechanism.

A further object of the invention is to provide such means which will be simple in construction and operation and which may be easily applied to the computing mechanism.

Other objects of the invention will appear as the mechanism is described in detail.

Figure 5:
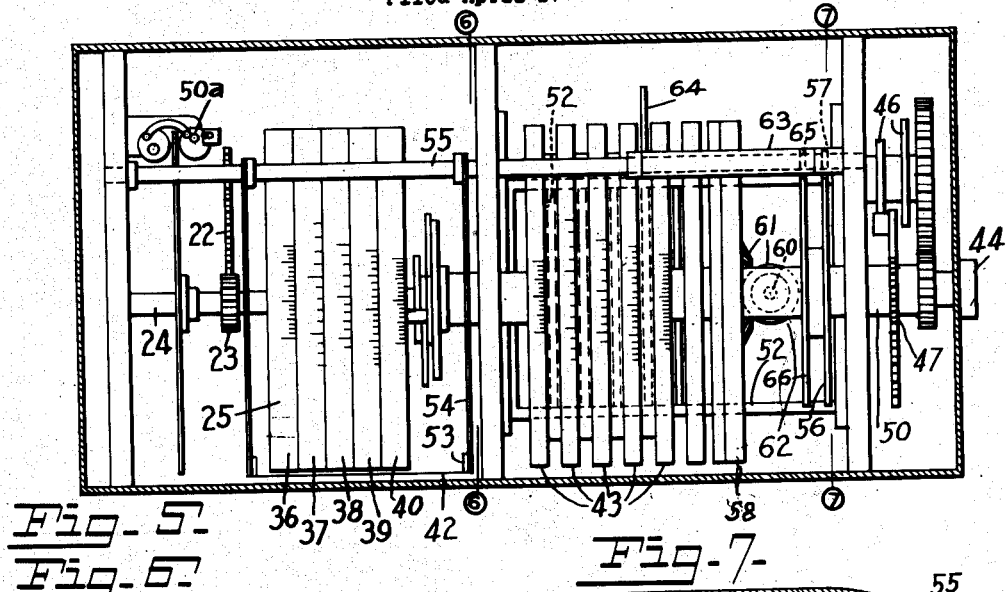
Figures 6, 7:
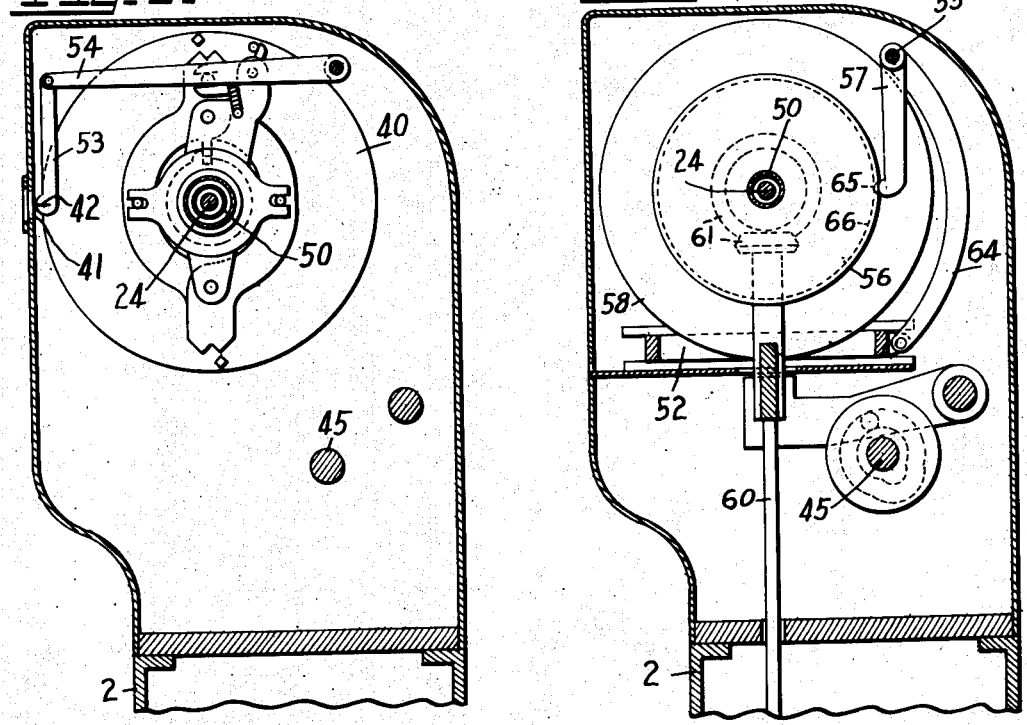
Figure 8:
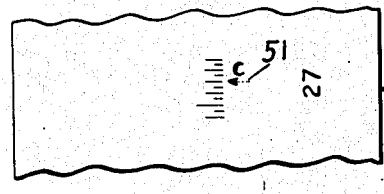

In the accompanying drawings Fig. 1 is a sectional view taken lengthwise of the casing, showing the mechanism in elevation; Fig. 2 is a section taken lengthwise of the base, showing the adjustable fulcrum for the connecting lever; Fig. 3 is a side elevation of a manually operated device for adjusting the weighing mechanism; Fig. 4 is a front elevation of the same; Fig. 5 is a plan view of the indicators and their associated mechanism, with the casing in section; Fig. 6 is a section taken on the line 6—6 of Fig. 5; Fig. 7 is a section taken on the line 7—7 of Fig. 5; and Fig. 8 shows a portion of a record strip produced by the printing indicator.

In carrying out my invention I provide means for compensating for any irregularities in the operation of the mechanism, due to the adjustment thereof, or otherwise. This compensating means may be of any suitable character and the adjustment thereof is automatically controlled in such a manner that the computation will be accurate in all adjustments of the mechanism. Preferably, I adjust the normally stationary member of an indicator, the movable member of which is operated by an actuating device, which, in the present instance, is a lever forming part of the weighing mechanism and operatively connected with the movable member of the indicator. This actuating device, or weighing mechanism, is adjustable to vary the movement imparted thereby to the movable member of the indicator, and the adjustment of the normally stationary member is controlled by the adjustment of the actuating device in such a manner that the normally stationary member of the indicator will occupy a certain fixed relation to the movable member in each adjusted position of the actuating device.

In the accompanying drawings I have, by way of illustration, shown the compensating device applied to a counting scale of the type shown in my copending application Serial No. 539,877, but it will be understood that the invention may be applied to computing mechanisms of various kinds and that it may take various forms. It may be applied to a visual indicator or it may be applied to a printing indicator in which the indication is printed upon a record sheet. The counting mechanism of the present application embodies both a visual indicator and a printing indicator and the normally stationary members, or reading lines, of both are adjusted automatically upon each adjustment of the weighing mechanism.

In that particular embodiment of the invention here illustrated the computing mechanism as a whole comprises a casing having a base portion 1 and a vertical stand- .d, or upright portion, 2 extending upwardly from the rear end of the base 1. Mounted within the base 1 is the usual weighing mechanism which actuates the counting devices according to the weight thereon. As here shown, two transverse bars 3 and 4 are mounted in the base and are provided at each end with a transverse arm, or cross head, 5. Each cross head is provided on each side of its axis with a pivot pin, as shown at 6 and 7. The outer pins 6 of the several arms engage bearings 8 carried by the base and form a support for the bars 3 and 4. The pins 7 at the inner ends of the cross heads engage bearings 9 in the lower ends of the legs, or standards, 10 which carry the platform 11. The bars 3 and 4 have inwardly extending arms 12 and 13, the inner ends of which are pivotally connected one to the other, as shown at 14, in such a manner that the connected ends may move downwardly relatively to the bars 3 and 4.

The counting mechanism is operatively connected with the weighing mechanism and, in the present instance, this connection comprises a lever 15 forming a part of the weighing mechanism and pivotally connected between its ends with the weighing mechanism. As here shown, the lever 15 is pivotally mounted on a part 16 of the arm 12 which extends rearwardly beyond the point of connection of that arm with the arm 13. The rear end of the lever 15 extends rearwardly into line with the upright portion, or standard, 2, of the frame, and is pivotally connected with a yoke 17 which in turn is connected by a flexible strap 18 with a segment 19 rigidly secured by a shaft 20. Mounted on this shaft and extending upwardly therefrom is an arm 21 having at its upper end a segment 22 which meshes with a gear 23 on a shaft 24 to which is secured a visual indicating drum 25, thus causing this drum to be rotated by the movement imparted to the lever by the weighing mechanism. The opposite, or forward, end of the lever is mounted on an adjustable fulcrum, the adjustment of which will vary the amount of movement imparted to the lever, and, consequently, the amount of movement imparted to the indicator drum, according to the weight on the platform 11. As here shown, the forward end of the lever is provided with a longitudinal slot 26 which embraces the fulcrum pin 27 adjustably mounted on the base 1. In the present mechanism, the fulcrum pin is carried by a sleeve 28 which is screw threaded onto an adjusting rod 29 so that the rotation of the adjusting rod will shift the position of the fulcrum with relation to the lever. The adjusting rod may be actuated either manually or automatically and in the present instance the rod 29 extends forwardly beyond the base 1 and has mounted thereon a disk, or a head, 30 provided with an operating knob 31 with which is connected a pin 32 adapted to enter a recess 33 in the bearing bracket 34 to secure the adjusting rod in a predetermined position. If desired, the adjusting rod may be provided with an indicator 35 to indicate the adjustment of the fulcrum but as this forms no part of the present invention it need not be here described. The indicator drum is shown as comprising five circumferential series of indications, or scales, 36, 37, 38, 39 and 40, all of which are arranged in line with a sight opening 41 in the casing which encloses the indicator. The reading line 42 extends across the sight opening and intersects the several series of indications and the adjustment of the mechanism is such that the indication which registers with this reading line represents the result of the computation, or count. As here shown, the series of indications 36 is graduated in ounces and when the adjustable fulcrum is in its normal position will indicate weight. The other series of indications are graduated to accommodate them to counting articles of different weights and each comprises a series of indicating lines spaced equal distances apart, the distance between the lines of the respective series of indications increasing from left to right. When a single article, or unit, is placed upon the platform 11 the lever 15 will move the drum a distance corresponding to the weight of the article. If the unit indication of any series of indications registers with the reading line no adjustment of the fulcrum is necessary as each additional article placed upon the platform will move the drum a similar distance and that particular series of indicating devices will accurately count the articles. If the movement imparted to the drum by the unit, or article, does not cause the unit indication of any one of the four series of indications to register with the reading line the fulcrum is adjusted until that registration is obtained upon some one series of indications.

This mechanism is also provided with means for printing a record of the indications and this printing indicator comprises a drum rotatably mounted about the axis of the shaft 24 and comprising a plurality of type carriers 43 having type corresponding to the indications on the respective series of indications on the visual indicating drum. These type carriers are rotatable independently of the indicator drum 25 so that no load is imposed upon that drum but the movement of the type carriers is controlled by the position of the visual indicator drum. To this end the type carriers are actuated by a crank 44 which is geared to a cam shaft 45 having cams 46 which actuate an arm 47 having a segment 48 meshing with a gear 49 on a sleeve 50 which is connected with the type carriers. After the articles to be counted have been placed upon the platform 11 the crank 44 is actuated and the first movement of this crank actuates locking devices 50ª connected with the visual indicator drum to rigidly secure the same against rotation. The further movement of the crank rotates the type carriers until their movement is interrupted by a suitable stop connected with the indicator drum and which serves to connect the type carriers with the indicator drum and to release the crank 45 from the type carriers so that the former can complete the printing operation. The mechanism for interrupting the movement of the type carriers is such that when connected with the indicator drum they will be in a position to print a record corresponding with the indication which appears at the sight opening 41. The means for locking the indicator drum, adjusting the type carriers with relation thereto, and printing the record are all fully shown and described in the above mentioned application and inasmuch as they form no part of the present invention it is not thought necessary to illustrate or describe them in detail. It will be noted, however, that the type carriers 43 are graduated in the same manner as is the indicator drum 25 and as the division lines are close together the record which is taken from the type carrier will show several graduations, or indicating lines, on each drum and in order to indicate on the record the particular line which represents the count or computation I have provided means for printing a reading line on the record, this line being shown in Fig. 8 as an arrow 51. The type from which these reading lines are printed are carried on bars 52 arranged adjacent to the respective type carriers 43.

The mechanism so far described is all shown and described in the above mentioned application and forms no part of the present invention except in so far as it enters into combination with the mechanism which I will now describe.

In order to compensate for any variations which may occur in the operation of the mechanism due to the adjustment of the movable fulcrum, or otherwise, I have provided means for adjusting the normally stationary member of each indicating device, which, in the case of the visual indicator is the reading line, and in the case of the printing mechanism is the type bar carrying the reading line 51. This adjustment is controlled by the adjustment of the fulcrum pin 27 and the means by which the adjustment is accomplished is so set or shaped when the mechanism as a whole is tested and sealed that the normally stationary members of the indicators will occupy definite predetermined positions for each adjusted position of the fulcrum, and this position will be such as to compensate for any irregularities in the operation of the lever 15. The adjustment of the indicator members may be accomplished in various ways but I prefer to movably mount the same and to provide a cam operated device for adjusting them, the cam operated devices being operatively connected with the means for adjusting the fulcrum 27. As here shown, the reading line 42 for the visual indicator is in the form of a fine wire secured at its ends to arms 53 arranged on opposite sides of the indicator drum 25 and supported by other arms 54 extending transversely to the axis of the indicator drum and rigidly secured to a shaft 55, the rotation of which will rock the arms 54 and raise or lower the reading line with relation to the indicator drum. This movement of the rock shaft is imparted thereto in the present instance by a cam 56 which is engaged by a rock arm 57 rigidly secured to the shaft 55. This cam may be connected with the adjusting device for the fulcrum pin in any suitable manner but the present machine is provided with an indicator drum 58 to indicate the position of the fulcrum pin, this drum being mounted on the same axis on which the type carriers are mounted and operatively connected with the setting rod 29 for the fulcrum pin. As here shown, this setting rod is connected by beveled gears 59 with a vertical shaft 60 which is connected at its upper end by beveled gears 61 with the indicator drum 58. Inasmuch as this drum moves in exact proportion to the movement imparted to the fulcrum pin I have connected the cam 56 with this indicator. In the present instance the indicator is provided with a sleeve 62 to which the cam is rigidly secured. When the computing mechanism as a whole is tested and sealed the sealer will so shape the periphery of the cam 56, by filing, or otherwise, that it will cause the reading line 42 to be so shifted with relation to the movable indicator drum that the reading on the indicator drum will accurately represent the computation. The cam having been once given the desired shape the reading line will be automatically adjusted to exactly the same position each time the fulcrum pin is moved to a given position. It will be obvious that if there is such irregularity in the operation of the lever 15, when the fulcrum pin is in a given position, that the indication on the drum 25 representing the actual count of the articles on the platform 11 will be slightly above or below the position of the reading line, the cam 56 can be so shaped that the reading line will be raised or lowered, as the case may be, to bring it into exact registration with the correct indication and as the reading line will assume this same position whenever the fulcrum pin is in said given position it will be apparent that the computation will always be accurate.

The type bars 52 carrying the reading line 51 for the printed record are operated in much the same manner as is the reading line 42 for the visual indicator. If desired, they may be operated from the same cam that operates the reading line 42 but for simplicity of construction and ease of adjustment I prefer to provide separate operating mechanisms. As here shown, I have mounted on the shaft 55 a sleeve 63 having rigidly secured thereto an arm 64 which is connected with the several type bars 52. These type bars are, in the present case, rigidly connected one to the other and are mounted for movement in unison with relation to the type carriers 43. Connected with the sleeve 63 is a rock arm 65 arranged to engage the periphery of a cam 66 similar to the cam 56. This second cam is shaped in the same manner and at the same time as is the cam 56, so that the printing line 51 may be adjusted in exactly the same manner as is the printing line 42. It will be apparent, therefore, that the various irregularities in the operation of the mechanism may be automatically compensated for and the indicators so controlled that they will accurately indicate the correct computation in all positions of the adjustable weighing mecahnism.

While I have shown and described one embodiment of my invention I wish it to be understood that I do not desire to be limited to the details thereof as various modifications may occur to a person skilled in the art.

Having now fully described my invention what I claim as new and desire to secure by Letters Patent is:

1. The combination with weighing mechanism and an indicator comprising a movable member operatively connected with said weighing mechanism, and a normally stationary member cooperating with said movable member to indicate the result of the computation, said weighing mechanism being adjustable to vary the movement imparted thereby to said movable member, of means controlled by the adjustment of said weighing mechanism to adjust said normally stationary member.

2. In a computing mechanism, an indicator comprising a movable member and a normally stationary member cooperating with said movable member to indicate the result of the computation, an actuating device for said movable member, said device being adjustable to vary the movement imparted thereby to said movable member, and means controlled by the adjustment of said actuating device to adjust said normally stationary member.

3. In a computing mechanism, an indicator comprising a movable member and a normally stationary member cooperating with said movable member, an actuating device for said movable member, an adjustable fulcrum for said actuating device, means for adjusting said normally stationary member, and an operative connection between said fulcrum and said adjusting means.

4. In a computing mechanism, an indicator comprising a movable member and a normally stationary member cooperating with said movable member, an actuating device for said movable member, an adjustable fulcrum for said actuating device, means for adjusting said fulcrum, and means operatively connected with said fulcrum adjusting means for adjusting said normally stationary member.

5. In a computing mechanism, an indicator comprising a movable member and a normally stationary member cooperating with said movable member, means comprising a cam for adjusting said normally stationary member, and means for actuating said cam.

6. In a computing mechanism, an indicator comprising a movable member and a normally stationary member cooperating with said movable member, an actuating device for said movable member having an adjustable fulcrum, means comprising a cam for adjusting said normally stationary member, and means for simultaneously adjusting said fulcrum and actuating said cam.

7. In a computing mechanism, an indicator comprising a movable member and a normally stationary but adjustable member cooperating with said movable member to indicate the result of the computation, means for adjusting said computing mechanism, an adjustable support for said normally stationary member, and means controlled by the operation of said adjusting means for adjusting said support.

8. In a computing mechanism, an indicator comprising a movable member and a normally stationary but adjustable member cooperating with said movable member to indicate the result of the computation, means for adjusting said computing mechanism, an adjustable support for said normally stationary member, a cam for adjusting said support, and means controlled by the operation of said adjusting means for actuating said cam.

9. In a computing mechanism, an indicator comprising a movable member and a normally stationary member cooperating with said movable member, an adjustable support for said normally stationary member, a cam for adjusting said support, an actuating device for said movable member having an adjustable fulcrum, and means for actuating said cam and thereby adjusting said fulcrum.

10. In a computing mechanism, an indicator comprising a movable member and a normally stationary member cooperating with said movable member, an adjustable support for said normally stationary member, a cam for adjusting said support, an actuating device for said movable member having an adjustable fulcrum, and means for actuating said cam and thereby adjusting said fulcrum and for maintaining the same in fixed relative positions.

11. In a computing mechanism, an indicator comprising a rotatable drum and a reading line, an adjustable but normally stationary support for said reading line, a device for actuating said drum, said device being adjustable to vary the movement imparted thereby to said drum and means controlled by the adjustment of said actuating device to adjust the support for said reading line.

12. In a computing mechanism, an indicator comprising a rotatable drum and a reading line, an adjustable but normally stationary support for said reading line, and means for adjusting said support for said reading line.

13. In a computing mechanism, an indicator comprising a rotatable drum and a reading line, an adjustable but normally stationary support for said reading line, a device for actuating said drum, said device being adjustable to vary the movement imparted thereby to said drum, a cam operatively connected with the actuating device for said drum, and an operative connection between said cam and the support for said reading line.

14. In a computing mechanism, an indicator comprising a rotatable drum and a reading line, an adjustable support for said reading line comprising a rock arm, a cam to act on said rock arm, a device for actuating said drum, said device being adjustable to vary the movement imparted thereby to said drum, and a geared connection between said actuating device and said cam.

15. In a computing mechanism, an indicator comprising a rotatable drum and a member constituting a reading line, rock arms supporting said member in a normally stationary position, an arm connected with said rock arms, a cam acting on said last mentioned arm, an actuating device for said drum, an adjustable fulcrum for said actuating device, and means for adjusting said fulcrum and actuating said cam.

16. In a computing mechanism, a movable type carrier, a normally stationary type bar having a reading line thereon, and means for adjusting said type bar.

17. In a computing mechanism, a movable type carrier, a normally stationary type bar having a reading line thereon, an adjustable device to control the movement of said type carrier, and means controlled by the adjustment of said device to adjust said type bar.

18. In a computing mechanism, an indicator comprising a rotatable drum and a reading line, an adjustable but normally stationary support for said reading line, an adjustable device for actuating said drum, a movable type carrier the movement of which is controlled by the position of said drum, a type bar mounted adjacent to said type carrier, and means controlled by the adjustment of said actuating device for said drum to adjust the support for said reading line and said type bar.

19. In a computing mechanism, an indicator comprising a rotatable drum and a member constituting a reading line, an actuating device for said drum, an adjustable fulcrum for said actuating device, means for adjusting said fulcrum, a support for said reading line member comprising a lever, a rotatable type carrier controlled by said drum, a type bar adjustably mounted adjacent to said type carrier, a lever connected with said type bar, rock arms connected with the respective levers, cams acting on the respective rock arms, and means controlled by the adjusting means for said fulcrum to actuate said cams.

In testimony whereof, I affix my signature hereto.

EDWARD B. LOCKE.